(12) United States Patent  (10) Patent No.: US 8,260,750 B1
Gugick et al.  (45) Date of Patent: Sep. 4, 2012

(54) INTELLIGENT BACKUP ESCALATION SYSTEM

(75) Inventors: David Mark Gugick, Hockessin, DE (US); Douglas Chrystall, Wellesley, MA (US); David Michael Swanson, Quincy, MA (US)

(73) Assignee: Quest Software, Inc., Aliso Viejo, CA (US)

( * ) Notice: Subject to any disclaimer, the term of this patent is extended or adjusted under 35 U.S.C. 154(b) by 167 days.

(21) Appl. No.: 12/725,191

(22) Filed: Mar. 16, 2010

Related U.S. Application Data

(60) Provisional application No. 61/160,617, filed on Mar. 16, 2009.

(51) Int. Cl.
G06F 7/00 (2006.01)
G06F 17/00 (2006.01)

(52) U.S. Cl. ........ 707/645; 707/646; 707/647; 707/653; 707/654

(58) Field of Classification Search .................. 707/640, 707/645, 647, 653, 646, 649
See application file for complete search history.

(56) References Cited

U.S. PATENT DOCUMENTS

| | | | |
|---|---|---|---|
| 7,330,997 B1 * | 2/2008 | Odom | 714/6.23 |
| 7,415,585 B1 | 8/2008 | Rossi | |
| 7,484,119 B2 * | 1/2009 | Fisher et al. | 707/999.202 |
| 7,761,678 B1 * | 7/2010 | Bodmer et al. | 711/165 |
| 2005/0114450 A1 * | 5/2005 | DeVos | 709/206 |
| 2008/0104145 A1 * | 5/2008 | Lipman et al. | 707/204 |

OTHER PUBLICATIONS

Data Backup and Recovery, from Chapter 14, Microsoft Windows 2000 Administrator's Pocket Consultants by William R. Stanek. Microsoft TechNet. Copyright 1999 Microsoft Corporation.
Scheduling a Backup, Microsoft TechNet, Microsoft Corporation.

* cited by examiner

Primary Examiner — Vincent Boccio
(74) Attorney, Agent, or Firm — Knobbe Martens Olson & Bear LLP

(57) ABSTRACT

This disclosure describes systems and methods for programmatically determining whether to perform full or partial backups. In some implementations, functionality is provided for intelligently escalating to a full backup based on one or more user-supplied escalation parameters. The escalation parameters can include a threshold of data change between backup files, which if exceeded, can result in escalation to a full backup. The escalation parameters can also include time parameters, computing resource consumption parameters, and other features that can govern full backup escalation. Additional features of the systems and methods described herein can include automatic adjustment of escalation parameters, multi-leveled backup set validation, and intelligent backup file cleanup.

16 Claims, 11 Drawing Sheets

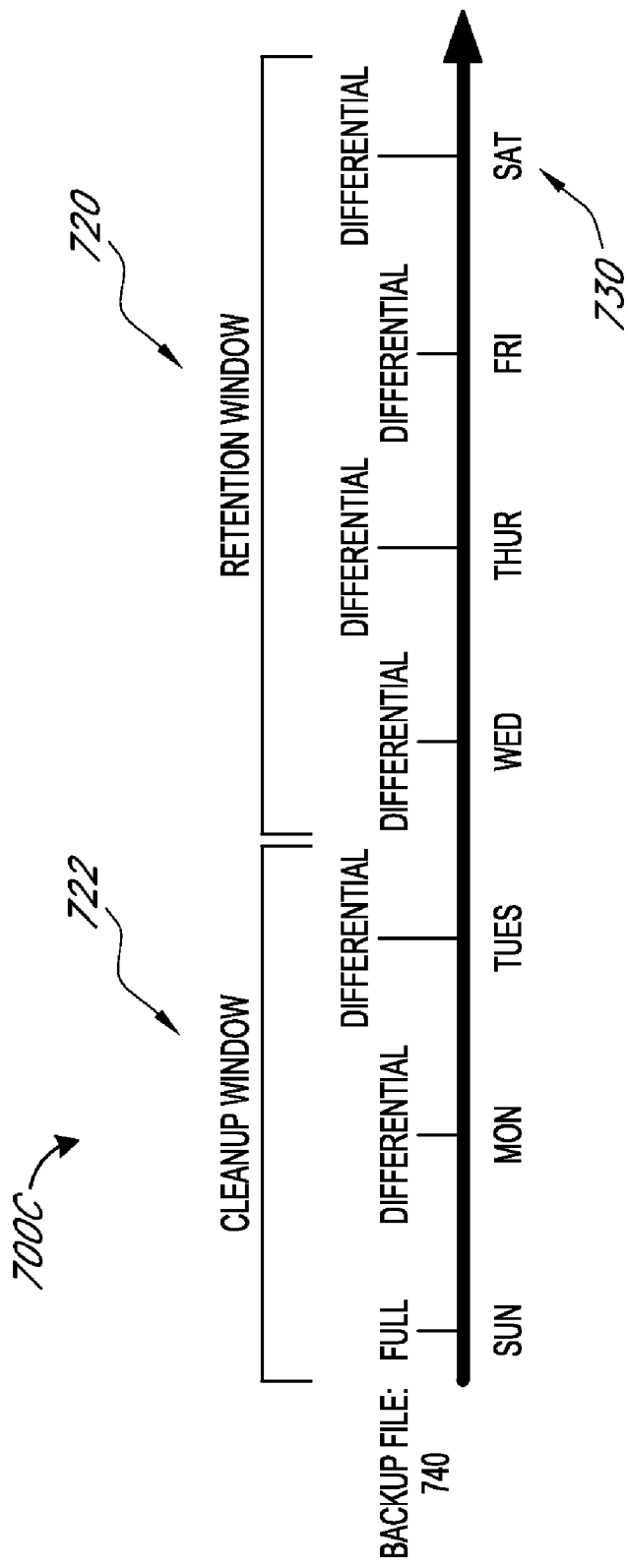

INTELLIGENT BACKUP ESCALATION SYSTEM

RELATED APPLICATION

This application claims the benefit of priority under 35 U.S.C. §119(e) of U.S. Provisional Patent Application No. 61/160,617, filed on Mar. 16, 2009, and entitled "Systems and Methods for Managing the Types of Backups Performed in a Computer System," the disclosure of which is hereby incorporated by reference in its entirety.

BACKGROUND

To protect against data loss, many computer systems use both full and partial backups. Full backups can contain a complete or substantially complete set of data and can be used to restore a data store (e.g., a file system or database) to the state it existed at the time of the backup. One advantage of full backups is that a single backup can be used to restore data. A disadvantage of full backups is that they can contain all or substantially all data of a data store and therefore are often the most time consuming backup type to complete.

Partial backups can be broken down into two main variations: differential and incremental. A differential backup can be a cumulative backup of all or substantially all changes made since the last full backup. When differential backups are used, restoring a data store includes restoring a full backup plus its associated differential backup. A potential disadvantage of using differential backups is that for each day elapsed since the last full backup, more and more data is often backed up, especially if a significant proportion of the data has been changed. Another potential disadvantage is that it is desirable to have the full backup available at restore time. Should any one of the backups be damaged (particularly the full backup), the restore will be incomplete and may not be able to be performed at all. A differential backup typically cannot work without its associated full backup.

In contrast, an incremental backup can be a backup of all or substantially all changes made since the last backup of any type. When incremental backups are used, restoring a data store includes restoring a full backup plus each incremental backup that occurred since the full backup. A potential disadvantage of using incremental backups is that in order to perform a restore, one needs to restore the last full backup first, followed by each of the subsequent incremental backups in the correct order. Should any one of the backups be damaged (particularly the full backup), the restore will be incomplete and may not be able to be performed at all. An incremental backup typically cannot work without its associated full backup and all or substantially all associated incremental backups.

Another form of protection against data loss called logging can be used for some data stores. A log can include a history of actions executed by a database management system (DBMS) or file system over time. Restoring a data store using logs can include restoring a full backup and performing all (or substantially all) transactions in each log occurring after the full backup. In some DBMS products, such as SQL Server™, these logs are referred to as transaction logs.

SUMMARY OF CERTAIN INVENTIVE ASPECTS

In certain embodiments, a method of managing a backup of a data store includes receiving user-supplied parameters for determining whether to initiate a full backup of a data store instead of a partial backup of the data store. The user-supplied parameters can include, in some cases, a data change threshold and a time threshold. The method can further include performing a first full backup of the data store, performing a first partial backup of the data store subsequent to performing the first full backup of the data store, and monitoring the data store according to the user-supplied parameters. The monitoring can include determining whether an amount of data change in the data store satisfies the data change threshold and determining whether a period of time since the first full backup occurred satisfies the time threshold. Moreover, the method can include performing a second full backup instead of a second partial backup in response to the data change threshold being satisfied. If neither the data change threshold nor the time threshold are satisfied, the second partial backup of the data store can be performed.

An intelligent backup system for managing a backup of a data store includes, in certain embodiments, a backup module that can perform a full backup of a data store and a partial backup of the data store. The full and partial backups can at least partially constitute a backup set for the data store. The system can further include a control console that can provide a user interface having functionality for a user to supply one or more escalation parameters. The one or more escalation parameters can include a data change threshold. Further, the system can include a backup agent in communication with the data store. The backup agent can include an escalation module that can monitor the data store according to the one or more escalation parameters and automatically trigger the backup module to start a second backup set in response to determining that the one or more escalation parameters have been satisfied.

A computer-readable storage medium having computer-executable program instructions can implement a method of managing a data store in various embodiments. The method can include performing a first full backup of a data store, performing a first partial backup of the data store, programmatically monitoring an amount of change with respect to the first partial backup, determining whether the amount of change satisfies a threshold, automatically performing a second full backup in response to determining that the amount of change satisfies the threshold, and performing a second partial backup in response to determining that the amount of change does not satisfy the threshold.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIGS. 7B and 7C depict timelines illustrating example cleanup processes.

DETAILED DESCRIPTION

I. Introduction

Partial backups can take less time to create and take up less storage than full backups. However, partial backups introduce a number of variables that increase the risk that a backup cannot be restored. For instance, system administrators are provided with little or no guidance for determining whether to perform a full backup as opposed to a partial. It can also be difficult for system administrators to understand the amount of data changed since the last full backup. Moreover, system administrators might also have to consider the impact of restore time as a result of creating multiple backup files by implementing partial backups. Finally, it can be a challenge to verify that complete backup sets (e.g., a full backup file plus one or more associated partial backup files) are maintained to ensure that a restore is possible.

This disclosure describes systems and methods for programmatically determining whether to perform full or partial backups. In certain embodiments, functionality is provided for intelligently escalating to a full backup based on one or more user-supplied escalation parameters. The escalation parameters can include a threshold of data change between backup files, which if exceeded, can result in escalation to a full backup. The escalation parameters can also include other parameters that govern whether to perform full or partial backups.

Additional features of the systems and methods described herein can include automatic adjustment of escalation parameters based on an analysis of a data store's backup history. In another embodiment, multi-leveled validation is performed to attempt to ensure backup set integrity. Further, intelligent backup set cleanup can be performed. These and other features are described in greater detail below in the context of the Figures.

The following example illustrates the potential advantages of using the systems and methods described herein. In this example, a database of 500 GB experiences about 1% data change per day and compression of about 80% using the LiteSpeed® product available from Quest Software of Aliso Viejo, Calif. Over a 14-day period, under certain conditions, LiteSpeed® full backups can consume about 1400 gigabytes of storage and take 243 minutes to process. Using the systems and methods described herein, in some configurations, the storage space used for backups is reduced to 212 gigabytes and the backup time is reduced to 36 minutes.

II. Backup System Overview

Figure 1:
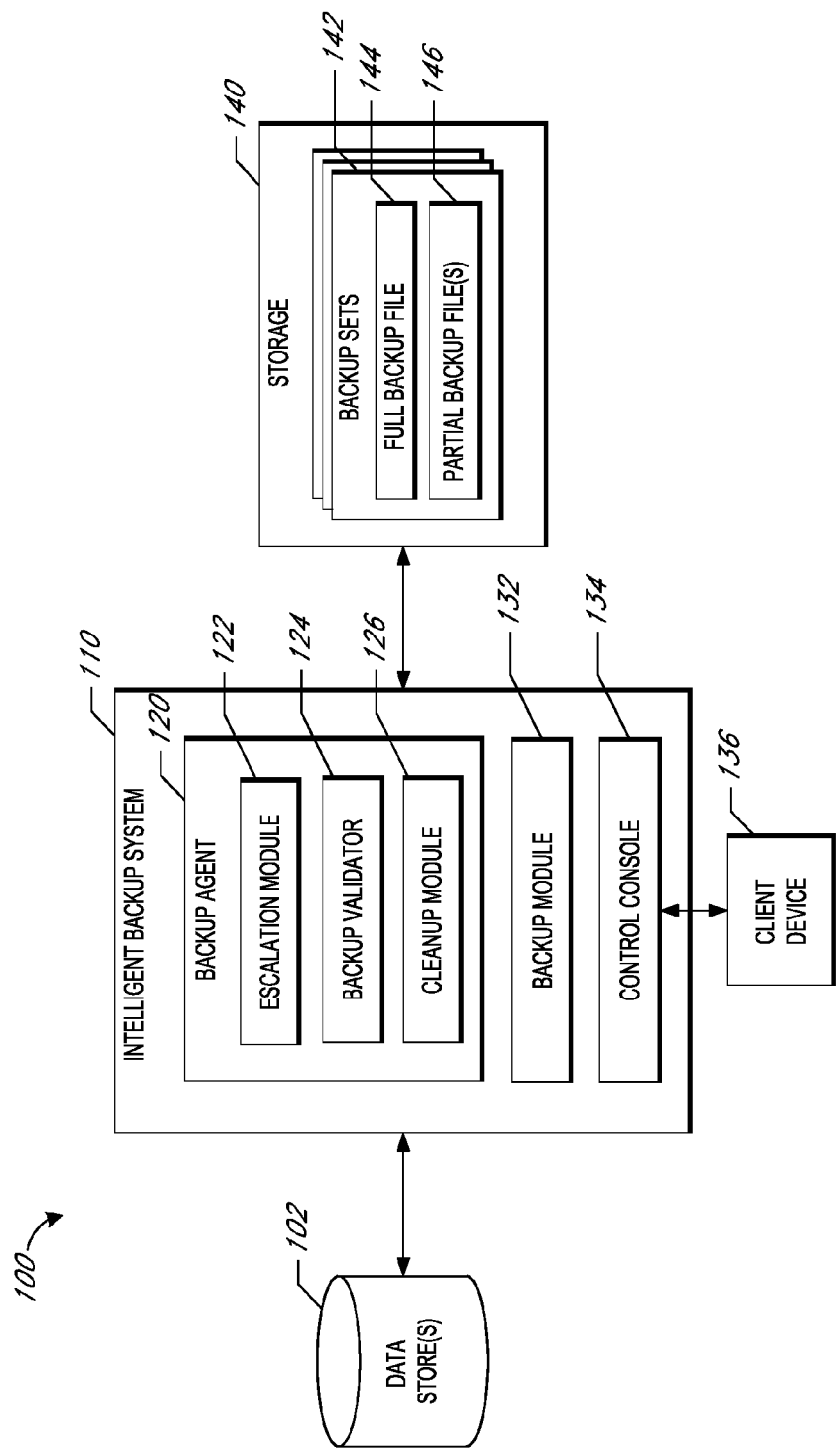
FIG. 1 depicts a block diagram illustrating an embodiment of an environment for intelligently backing up a data store.

Referring to FIG. 1, an environment 100 for intelligently backing up a data store 102 is shown. In the environment 100, an intelligent backup system 110 communicates with one or more data stores 102 and storage 140. The intelligent backup system 110 can automatically backup data in the one or more data stores 102, saving the data to the storage 140. The intelligent backup system 110 provides a mechanism for programmatically determining whether to perform full or partial backups. As a result, in certain embodiments, the intelligent backup system 110 advantageously reduces backup times, backup storage consumption, and/or backup restore times.

The one or more data stores 102 can include any physical or logical data storage, such as file systems, databases, and the like. The one or more data stores 102 can also be referred to as data repositories or data sources. Any type of data can be stored in the one or more data stores 102, including business data, personal data, and the like.

The intelligent backup system 110 can include hardware and/or software for backing up the data in the data stores 102. For example, the intelligent backup system 110 can include one or more machines such as physical computing devices (e.g., servers, client devices, or the like). In one embodiment, the intelligent backup system 110 and the one or more data stores 102 are implemented on separate computing devices. The intelligent backup system 110 can therefore communicate with the one or more data stores 102 over a network, such as a LAN, WAN, or the Internet. In another embodiment, the intelligent backup system 110 and the one or more data stores 102 are installed on the same device.

The depicted embodiment of the intelligent backup system 110 includes several components, some of which can be omitted in certain implementations. As shown, the intelligent backup system 110 includes a backup agent 120, a backup module 132, and a control console 134. The backup agent 120 can communicate with the one or more data stores 102 and with the storage 140. The backup agent 120 further includes an escalation module 122, a backup validator 124, and a cleanup module 126.

The escalation module 122 can monitor the one or more data stores 102 according to one or more escalation parameters. The escalation parameters can include rules for automatically triggering a full backup to be performed instead of a partial backup. The escalation module 122 can therefore use the escalation parameters to relieve the burden on users of determining when to perform full or partial backups. Moreover, the escalation module 122 can use the escalation parameters to reduce backup times, backup storage consumption, and/or backup restore times. The escalation parameters and the features of the escalation module 122 are described in greater detail below with respect to FIGS. 2 through 5.

The backup validator 124 can validate backup sets 142 in the storage 140 to ensure or attempt to ensure backup set 142 integrity. Each backup set 142 can include a full backup file and one or more partial backup files 146. If the partial backup file 146 is a differential backup file, for example, a backup set 142 can include a full backup file 144 and its associated differential backup file. Likewise, for incremental backups, a backup set 142 can include a full backup file 144 and possibly multiple incremental backups files that are associated with the full backup.

Backup sets 124 can be logical or physical. That is, each backup set 124 can be contained in a single file or can be a collection of separate, but related files. Using a single file to store backup sets can simplify management of backups, making it easier to locate backup files. In addition, using a single backup set file can mask the complexities of full and partial backups from users. However, using separate backup set files can also have benefits, such as ease of cleanup and faster archival of files to tape (e.g., because the separate files are smaller). The features of the backup validator 124 are described in greater detail below with respect to FIG. 6.

The cleanup module 126 can perform intelligent cleanups of old backup files. In certain embodiments, the cleanup module 126 programmatically removes old backup files without removing files relied upon by more recent backup files. For instance, the cleanup module can intelligently determine whether an old full backup file is relied upon by a more recent partial backup file and can then refrain from deleting the old full backup file. The features of the cleanup module 126 are described in greater detail below with respect to FIGS. 7A, 7B, and 7C.

The backup module 132 of the intelligent backup system 110 can perform backups of the one or more data stores 102. The backup module 132 can perform full and partial backups. The backup module 132 stores backup files in the storage 140. In certain embodiments, the backup module 132 creates the backup sets 142.

The control console 134 can provide functionality for a user (such as a system administrator) to specify one or more escalation parameters to be used by the escalation module 122 in managing backups. The control console 134 can provide one or more user interfaces that allow users to supply the escalation parameters. The control console 134 can be accessed by a client device 136, which can be any form of computing device. In certain embodiments, the control console 134 is also directly accessible on a server incorporating the intelligent backup system 110. Example user interfaces output by the control console 134 are described below with respect to FIGS. 8 and 9.

III. Backup Escalation

Figure 2:
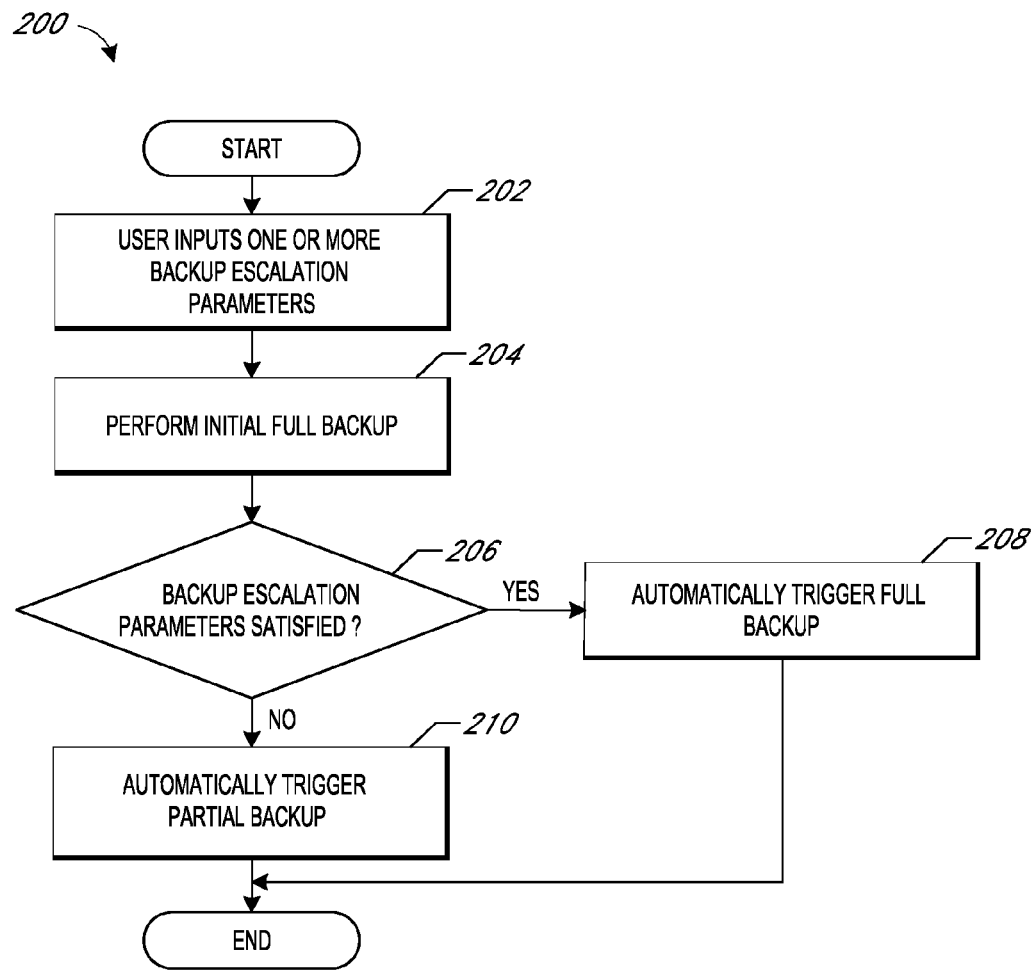
FIGS. 2 and 3 depict flowcharts illustrating embodiments of backup escalation processes.
Figure 3:
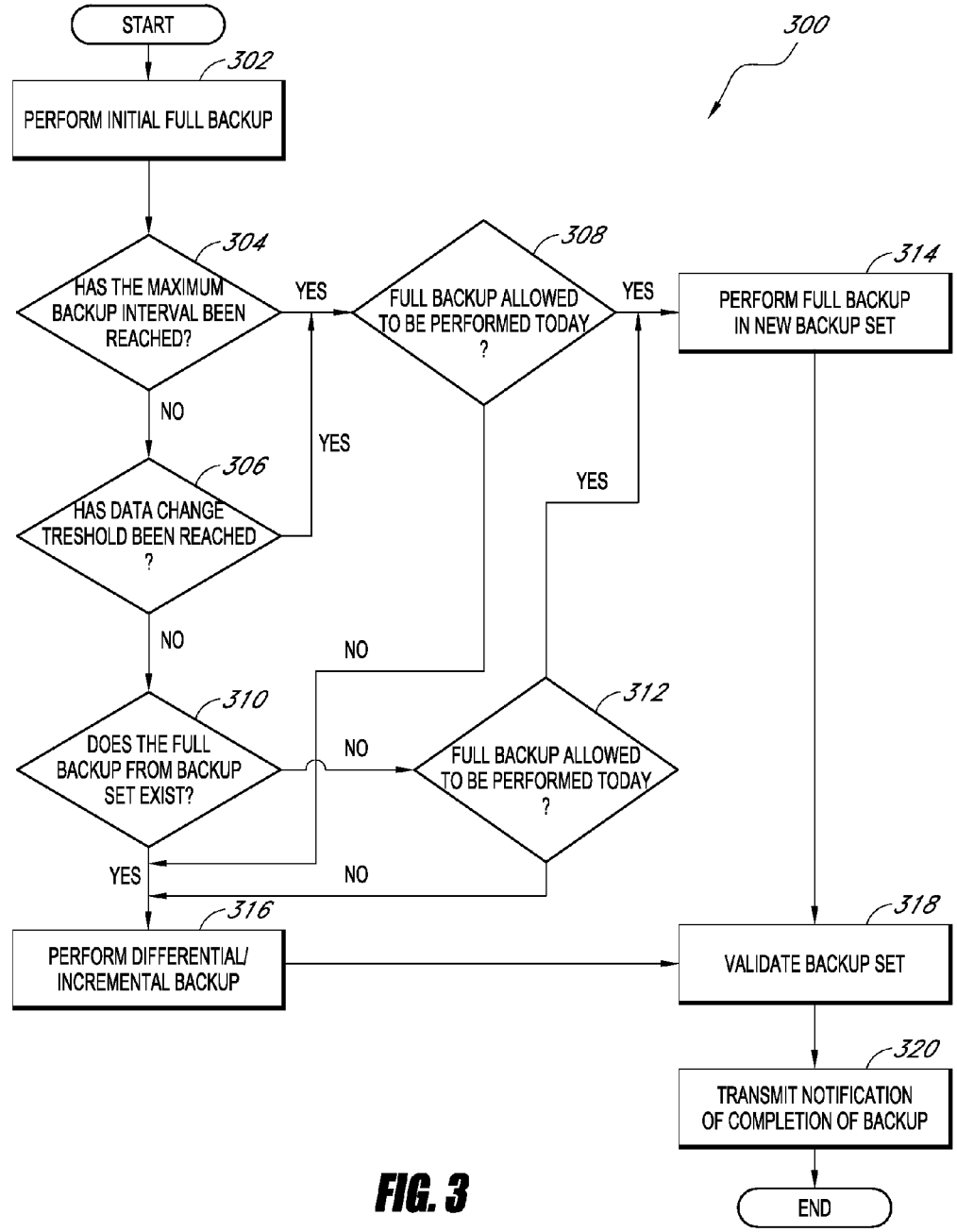

FIGS. 2 and 3 illustrate embodiments of backup escalation processes 200, 300. In the backup escalation process 200 of FIG. 2, features for automatically triggering full backups are shown. Both of the processes 200, 300 can be implemented by the intelligent backup system 110 described above.

By way of overview, in the process 200 of FIG. 2, a user inputs one or more backup escalation parameters at block 202. The user can input the escalation parameters using the control console 134 described above. At block 204, an initial full backup is performed, e.g., by the backup module 132. It is determined at block 206 whether the user-supplied escalation parameters have been satisfied. If so, another full backup is automatically triggered at block 208. Otherwise, a partial backup is automatically triggered at block 210. Blocks 206 through 210 can be implemented by the escalation module 122.

In more detail, at block 202, the control console 134 can provide a variety of different types of escalation parameters that can be selected or supplied by the user. For example, a user can supply an escalation parameter that triggers a full backup at block 208 if the data change amount exceeds a threshold. The data change threshold can be expressed as a percentage of data change or as an absolute value of data change (e.g., in bytes or the like). Thus, for example, a data change threshold of 20% can represent that when the data store 102 has changed 20% (or approximately 20%), that a full backup might be performed instead of a partial backup. The escalation module 122 can monitor amounts of data change occurring in the data store 102.

In some systems, a full backup of a data store is performed on a first day and differential backups are performed on subsequent days. As data in the data store changes each day, each succeeding differential backup can be larger than the preceding differential backup. As the differential backup files grow larger, additional storage is consumed for both the full backup file and a differential backup file. Larger differential backup files can also take longer to generate and can take longer time to restore from. Advantageously, in certain embodiments, the user-supplied data change threshold can automatically trigger a full backup instead of a differential (or incremental) backup to reduce the impact on backup time, storage space, and/or restore time. Some techniques for optimizing escalation parameters for backup time, storage space used, and restore time are described in greater detail below.

The escalation module 122 can monitor the data change periodically, such as daily, hourly, or on some other time interval. In certain embodiments, the escalation module 122 determines the amount of data change in one of two ways. One approach (referred to herein as the "access method") is for the escalation module 122 to access the data store 102 to determine a quantity of storage units changed since the last backup (partial or full). Storage units can include space on disk reserved for a file or application, such as one or more blocks, a page of blocks, a group of collection of blocks, a row or column in a database, a table in a database, or the like. If the data store 102 is a database, the escalation module 122 can query the database to determine the number of storage units that have been changed. The escalation module 122 can compare the number of changed storage units with the total number of storage units in the database to determine a percentage of data change. For a file system, the escalation module 122 can access metadata in the file system to determine a number of changed storage units. The escalation module 122 can compare the changed number with the total number of storage units to arrive at a data change percentage.

Another technique for determining the amount of data change is to compare the size of a full backup file with the size of the previously-taken differential backup file. Similarly, the size of a full backup file can be compared with the size of the full backup's corresponding incremental backup files. This technique is referred to herein as the "comparison method." While the comparison method may not determine the amount of change since the last backup, it nevertheless can be an effective way to estimate the change occurring in the data store. In one embodiment when the comparison method is used, the escalation module 122 compares the determined amount of change with the data change threshold. In another embodiment, the escalation module 122 can extrapolate the current data change since the last backup based at least partly on the determined amount of data change. In yet another embodiment, the escalation module 122 determines the amount of data change using the comparison method if the access method fails or is not available.

Another escalation parameter that can be selected by a user at block 202 is a user-adjustable threshold on the number of files that are maintained in any given backup set. Files that are counted toward this threshold can include both full and partial backup files or can merely include partial backup files. Another similar threshold is a user-adjustable limit on the time (e.g., number of days) that partial backups are taken before a full backup is triggered. Both the number of files threshold and the time threshold can be referred to more generally as a maximum backup interval.

One of the disadvantages of partial backup files is that they can be physically tied to their full backup file. This means that, in some instances, complete backup sets are maintained if one desires to be able to restore to a point in time after the full backup. Each new backup file can pose a potential risk in that any damage to a backup (particularly the full backup) can limit one's ability to restore data. If there is X % chance of corruption, the risk of corruption when performing full backups is X %. However, with N backup files, the risk can increase to (N*X %). Thus, the maximum backup interval (determined by either number of files or time elapsed) can be used to reduce the risk of backup file corruption.

In some embodiments, the maximum backup interval takes precedence over the data change threshold. Alternatively, the maximum backup interval can be weighted equally or less than the data change threshold. As an example, a user might set the data change threshold to 10% and the maximum backup interval to 14 total files. If the amount of data change reaches 10% before 14 backup files are accumulated, the escalation module 122 can trigger a full backup. If, however, the number of backup files accumulated reaches 14 before the data change threshold reached 10%, the escalation module 122 can also trigger a full backup.

In certain embodiments, users can adjust the escalation parameters to improve or optimize backup time, storage space used, and/or restore time. Some users may prefer to reduce or minimize daily backup times, for instance. These users may be more tolerant of longer restore times so long as backup time is reduced. Thus, these users might set a higher data change threshold to allow the backup system 110 to perform frequent partial backups. Likewise, these users might set a higher maximum backup interval to trigger full backups less frequently. Another user might prefer to reduce or minimize restore time and may be more tolerant of longer backup times. This user might instead set a smaller data change threshold and/or smaller maximum backup interval to result in more frequent full backups. Restore operations in this user's system might therefore be relatively fast because fewer or smaller partial backup files might be used in the restore.

Still other users might adjust the escalation parameters to reduce the impact of backups on storage space. For instance, these users might use a lower data change threshold to attempt to ensure that partial backup files are created that do not exceed the amount of storage they wish to allocate. In one embodiment, the data change threshold for such systems can depend on how quickly the particular data store changes.

In another embodiment, if a particular data store occasionally experiences a high amount of data change, a user might not want this change to trigger a full backup because the occurrence of high data change events is infrequent. In such cases, the user might opt to use a higher data change threshold.

In certain embodiments, the escalation module 122 can adjust the data change threshold or other escalation parameters to improve or optimize backup time, storage utilization, and/or restore time. For instance, the escalation module 122 can programmatically determine whether it is better to trigger a full backup on a given day because partial backups over the next days will be smaller and therefore impact storage space less. Additional automatic adjustment features are described below with respect to FIGS. 5A and 5B.

Other escalation parameters that may be used by the escalation module 122 can include a backup time threshold and a computing resources threshold. In one embodiment, the escalation module 122 can compare the duration of a backup process (e.g., a process that creates a backup file) and compare this duration to a backup time threshold. If the duration of the backup process satisfies (e.g., meets or exceeds) the backup time threshold, the escalation module 122 can escalate to a full backup. As partial backups grow in size, the duration of the backup process can increase accordingly. Thus, measuring the backup process duration can be an indirect way to measure data change in the data store.

Similarly, the computing resources threshold can be used by the escalation module 122 to compare the usage of one or more computing resources to one or more thresholds. Computing resources can include devices such as processors, memory, networks, and the like, as well as systems that use these computing devices. The escalation module 122 can measure utilization of any of these resources during, before, and/or after a backup process occurs as an indirect measure of change in a data store. For example, the escalation module 122 can measure a backup process's throughput over a network (e.g., bytes per second or packets per second), total bytes transferred from one device to another, and the like. In certain embodiments, an increased utilization of these computing resources can reflect an increase in partial backup size. Thus, the escalation module 122 can compare these measurements with a threshold or other criterion to determine whether to escalate to a full backup.

Either of the backup time and the computing resources thresholds can take the place of or be used in conjunction with the data change threshold and/or the maximum backup interval, in any combination. More generally, any change with respect to a data store, full backup, partial backup, or log can be monitored with respect to some threshold or other criterion. When one or more thresholds or other criterion is satisfied, escalation to a full backup can occur.

Referring to FIG. 3, a more detailed backup escalation process 300 is shown. The backup escalation process 300 illustrates one possible implementation for using different escalation parameters together, namely the data change threshold and the maximum backup interval. In addition, the backup escalation process 300 illustrates another escalation parameter, a blackout period parameter. Additional features performed by the process 300 include validation of a backup set and a backup notification that can be provided to the user.

At block 302, an initial full backup is performed (e.g., by the backup module 132). At decision block 304, it is determined whether the maximum backup interval has been reached. As described above with respect to FIG. 2, the maximum backup interval can be a time threshold or a number of files threshold. If the maximum backup interval has not been reached, the process 300 proceeds to decision block 306. Otherwise, the process proceeds to decision block 308. Blocks 304 through 308 can be implemented by the escalation module 122.

At decision block 306, it is determined whether a data change threshold has been reached. If not, the process 300 proceeds to block 310. At block 310, it is determined whether the full backup file exists before allowing a differential/incremental. Block 310 can be implemented by the backup validator 124. Since each differential/incremental is tied to its full backup in certain implementations, it may be of no use to run a differential/incremental if the full backup does not exist. In other embodiments, the location of each backup file is determined. If the full backup file exists, the process 300 proceeds to block 316, where a partial backup is performed. Otherwise, the process 300 proceeds to block 312.

From blocks 304 and 306, the process 300 proceeds to block 308, where it is further determined whether a full backup is allowed to be performed today. Likewise, from block 310, the process 300 proceeds to block 312, which includes the same features as block 308. Decision blocks 308 and 312 reflect a blackout period escalation parameter. The blackout period escalation parameter can allow a user to specify time periods (such as days) where full backups (or other backups) cannot automatically occur. Thus, even if one of the thresholds described above is reached, a full backup can be prevented from running. This feature can allow users to prevent full or other backups from reducing available maintenance time on a given day.

Thus, if full backups are allowed to be performed today, the process 300 proceeds to block 314, where a full backup in a new backup set is performed. Otherwise the process 300 proceeds (e.g., from block 312) to block 316, where a partial backup is performed. Blocks 314 and 316 can be implemented by the backup module 132. From either block 314 or block 316, the process proceeds to block 318.

At block 318, the validity of the backup set is checked, for example, by the backup validator 124. Determining the validity of the backup set can ensure or attempt to ensure backup set integrity. Without backup set integrity, it may not be possible to restore from a backup set. Example features for determining backup set validity are described below with respect to FIGS. 6 and 9.

Notification of completion or failure of the backup is transmitted to a user at block 320. This block can be implemented by the backup agent 120. Notification can be in the form of an e-mail message, text message, or other form of message that is sent to the computing device of the user. In one embodiment, notification is sent to the control console 134, which outputs an indication reflecting the notification on a user interface accessible by the client device 126.

Figure 4:
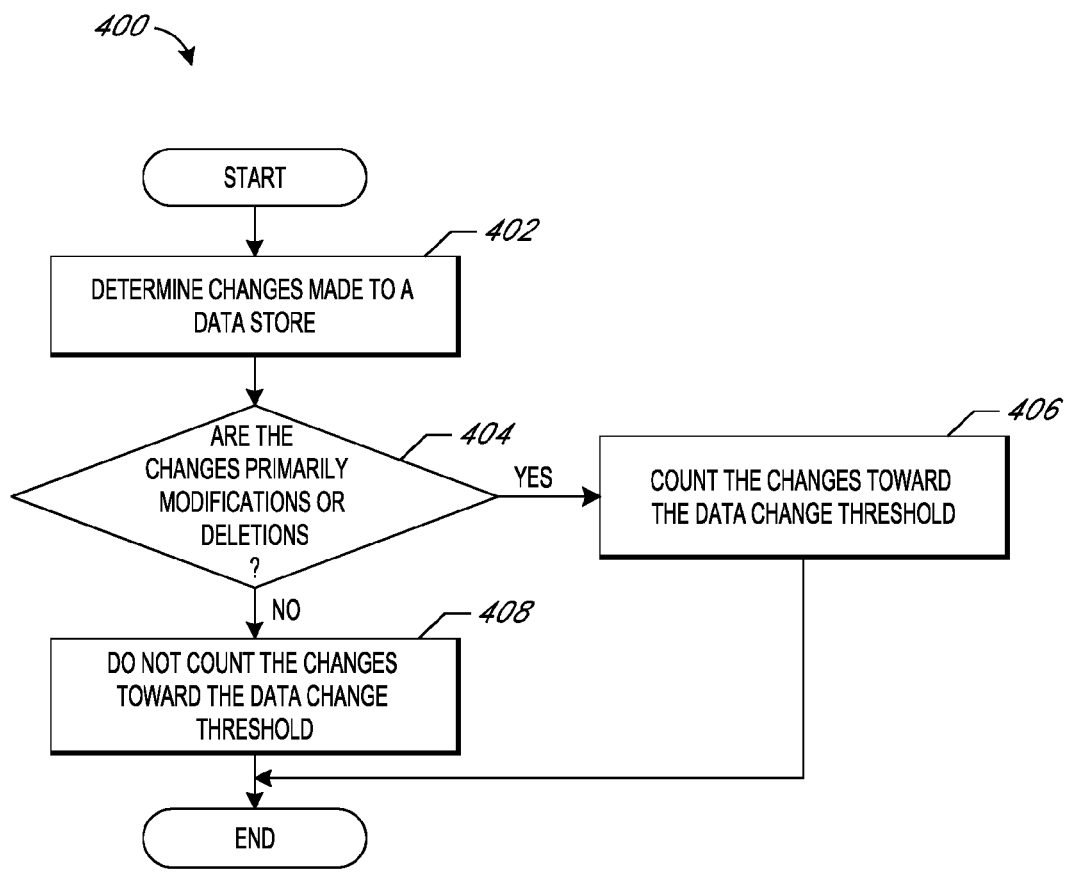
FIG. 4 depicts a flowchart illustrating an embodiment of a process for analyzing changes to a data store.

FIG. 4 illustrates an embodiment of a process 400 for analyzing changes to a data store. The process 400 can be implemented by the escalation module 122. Advantageously, in certain embodiments, the process 400 provides a mechanism for improving the usage of the data change threshold as an escalation parameter.

At block 402, it is determined what changes were made to a data store. This block can be implemented using the access and/or comparison methods described above with respect to FIG. 2. However, in certain embodiments, the access method is used to determine more information about the types of changes that were made to the data store. In certain embodiments, the access method determines three types of changes, including modifications, deletions, and additions to a data store. Modifications can include changes to existing data, such as updates to rows in a database table. Additions can include new data added to a data store, such as an insertion of a row into a database table. Deletions may or may not be tracked in certain embodiments. The type of changes made to a data store can be determined by accessing logs for the period corresponding to the changes.

It is determined at decision block 404 whether the changes are primarily modifications or deletions. If the changes are primarily modifications or deletions, creating a partial backup file can result in a backup set (e.g., one or more partial backup files plus a full backup file) that is substantially larger than a newly-created full backup. In contrast, if the changes are primarily additions, creating a partial backup file can result in a backup set that is about the same size as a new full backup file.

Thus, if the changes are primarily modifications or deletions, at block 406 the changes are counted toward the data change threshold. Otherwise, the changes are not counted toward the data change threshold at block 408. By counting the changes toward the data change threshold when they are modifications or deletions, full backups are likely to be triggered more quickly, resulting in potentially smaller backup sets. When the changes are additions, backup sets are approximately the same size regardless of whether partial or full backups are used. Therefore, the additions need not be counted towards the threshold in certain embodiments.

In another embodiment, some portion or percentage of the additions can be counted toward the threshold. In yet another embodiment, modifications, deletions, and additions can be weighted differently such that all three types of changes count toward the threshold. For example, modifications and deletions can have higher weights than weights applied to additions. Moreover, modifications can be weighted differently from deletions. Deletions might be weighted higher than modifications (e.g., count toward the threshold more quickly). A new full backup resulting from mainly deletions could be significantly smaller than a new full backup resulting from mainly modifications. In other embodiments, modifications are weighted higher than deletions.

IV. Auto-Tuning of Escalation Parameters

Figures 5A, 5B:
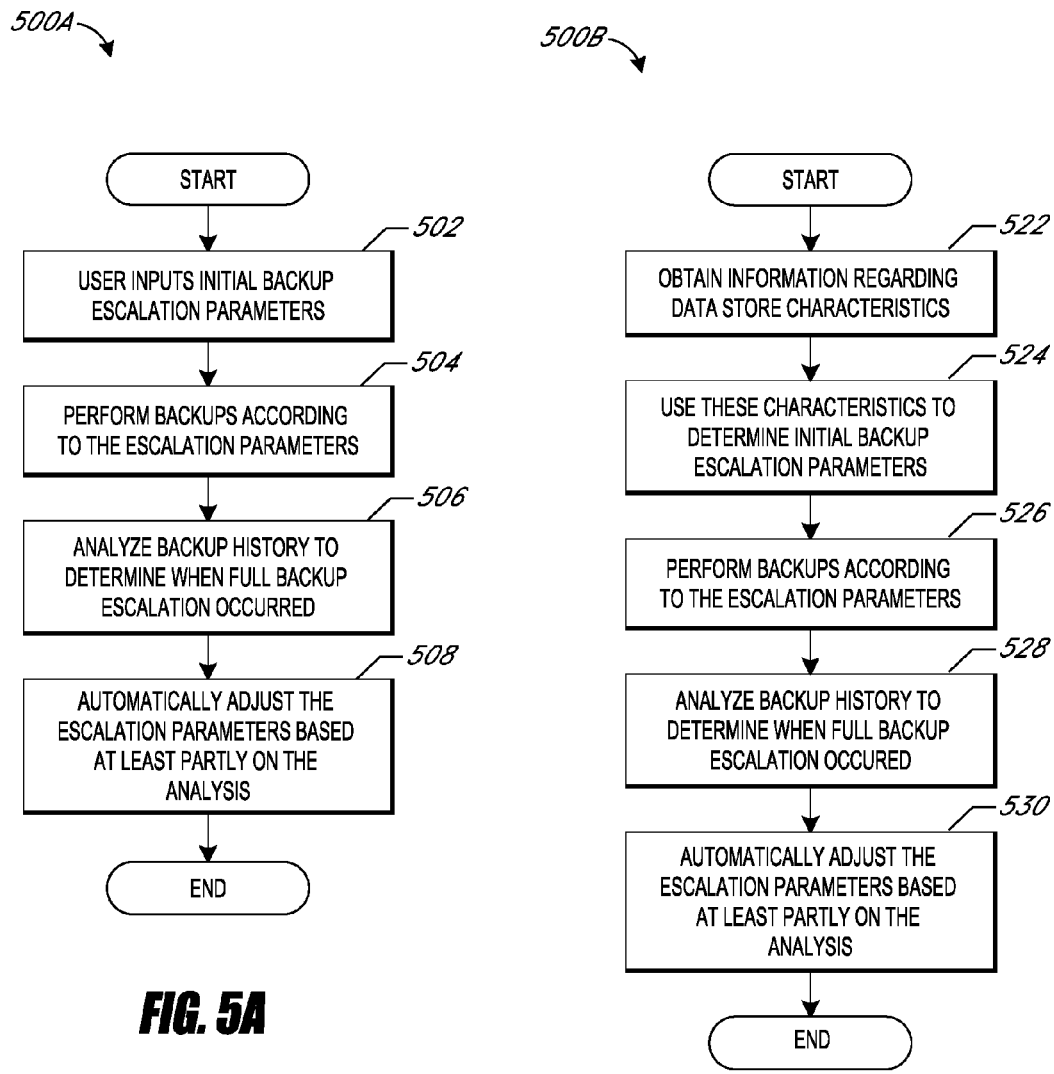
FIGS. 5A and 5B depict flowcharts illustrating embodiments of adaptive escalation processes.

FIGS. 5A and 5B illustrate embodiments of adaptive escalation processes 500A, 500B. The processes 500A, 500B can be implemented by the intelligent backup system 110. The processes 500A, 500B can advantageously auto-tune one or more escalation parameters in certain embodiments.

Referring to FIG. 5A, a user inputs initial backup escalation parameters at block 502. This block can be implemented using any of the features described above with respect to block 202 of FIG. 2. At block 504, backups are performed according to the escalation parameters. This block can be implemented using the backup module 132.

Continuing, at block 506, a backup history is analyzed to determine when full backup escalation occurred. The backup history can include information regarding previous full and/or partial backups such as when these backups occurred and what triggered their occurrence. At block 508, the escalation parameters can be automatically adjusted based at least in part on the analysis performed at block 506. For instance, thresholds can be adjusted to project for desired storage space, backup time, and/or restore time parameters. Blocks 506 and 508 can be implemented by the escalation module 122.

To illustrate, in one example embodiment, a user might set a maximum backup interval to 14 days and a data change threshold of 20%. An analysis of the backup history by the escalation module 122 might indicate that the 20% data change threshold is being triggered approximately every four days. The escalation module 122 can then adjust either the data change threshold or the maximum backup interval based on a desired outcome. If a user desires to reduce the number of times a full backup occurs, for instance, the escalation module 122 might increase the data change threshold. The control console 104 can expose auto-tuning options for a user, allowing the user to prioritize escalation parameters for storage space, backup time, and/or restore time, among other desired outcomes.

FIG. 5B illustrates a variation of the process 500A, namely the process 500B. At block 522, information is obtained regarding characteristics of a data store. This information can be input by a user or can be obtained programmatically by the escalation module 122. In one embodiment, the characteristics of the data store include the rate at which the data store changes, the types of changes typically made to the data store (e.g., modifications, deletions, or additions), the type of storage media that the data store is stored on, the size of the storage media, the type of data involved (e.g., financial data may be backed up more often), combinations of the same, and the like.

The remainder of the process 500B can be implemented by the escalation module 122. At block 524, the characteristics obtained about the data store can be used to determine initial backup escalation parameters. Thus, instead of a user determining the escalation parameters, the escalation parameters can be determined programmatically.

In one embodiment, the user inputs a desired maximum backup interval but not a data change threshold. The escalation module 122 can then analyze the logs or the full/partial backup history to determine when full backups are occurring. Based on the user's desired maximum backup interval, the escalation module 122 can select a data change threshold that may (for example) trigger full backups prior to or around the maximum backup interval.

The user can instead input a desired data change threshold but not a maximum backup interval. The escalation module 122 can then set the maximum backup interval based on an analysis of the logs or other backup history. For example, if the escalation module 122 determines that the user's desired data change threshold has previously been met approximately every 7 days, the escalation module 122 can set the maximum backup interval to 7 days.

The escalation module 122 can also use the optimization criteria described above to derive escalation parameters. For example, as described above, a user might desire backups to be optimized for backup time, restore time, and/or storage utilization. The escalation module 122 can select escalation parameters according to the user's desired optimization. For example, the escalation module 122 can analyze the logs and/or backup history to determine a rate of change of the data store and select appropriate thresholds to trigger full backups according to the optimization criteria.

Further, in some data stores, portions of the data store change at a slower rate than other portions of the data store. The escalation module 122 can detect the rate of change different portions of the data store have based on analyzing logs or other backup history. A user can also supply this rate of change information to the escalation module 122. The escalation module 122 (or a user) can therefore establish different escalation parameters for different portions of a data store.

Blocks 526 through 530 of the process 500B can proceed in the same or similar manner as blocks 504 through 508 of the process 500A.

V. Backup Validation

Each new backup file can pose a potential risk in that any damage to a backup file (particularly the full backup file) can limit one's ability to restore data. Thus, as mentioned above, the backup validator 124 can validate backup sets to ensure or attempt to ensure backup set integrity. Techniques for validating a backup set will now be described in greater detail.

Figure 6:
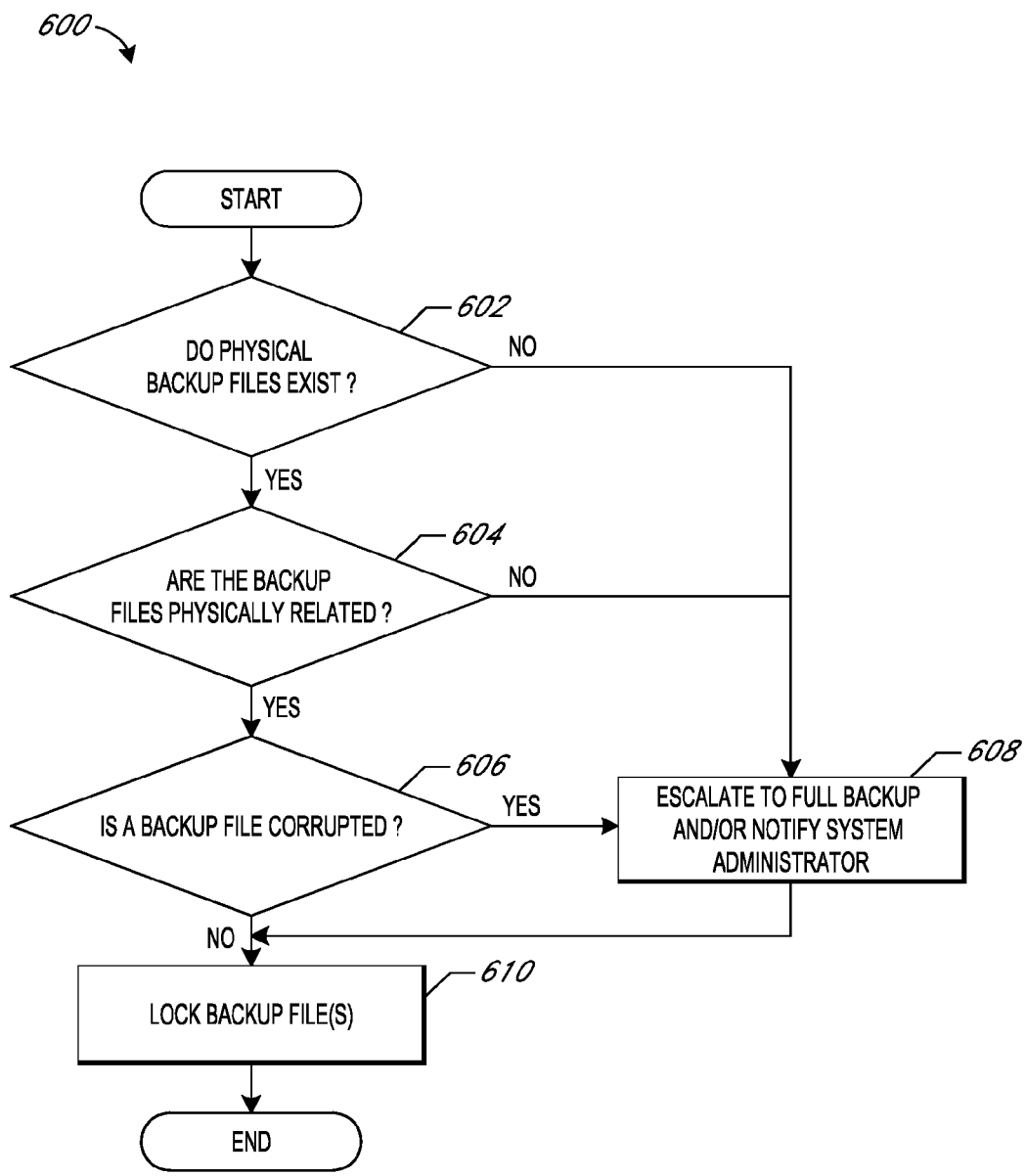
FIG. 6 depicts a flowchart illustrating an embodiment of a process for validating backups.

FIG. 6 illustrates an embodiment of a process 600 for validating backups. The process 600 can be implemented by the backup validator 124. Advantageously, in certain embodiments, the process 600 implements multi-leveled validation to ensure or to attempt to ensure backup set integrity. However, although multi-leveled validation can be used, fewer than all of the validation features shown can be used in some implementations.

At block 602, it is determined whether physical backup files (e.g., partial or full) in a backup set exist. This block can include searching in a last known location for a file. The last known location might include a pathname, directory or file folder, physical drive, logical drive, combinations of the same, or the like. If the physical backup file does not exist, full backup escalation is performed at block 608 to attempt to ensure that a valid backup will exist. A system administrator can also be notified of the problem in addition to or instead of escalating to a full backup.

If a physical backup file does exist, it is further determined at block 604 whether the backup files in the backup are physically related. The system can determine whether partial backups are related to full backups by examining metadata in the backup files for a reference. For example, in Microsoft's SQL Server relational database management system (DBMS), the backup validator 124 can search for a reference called a log sequence number (LSN) in headers of the backup files. If the LSN of a differential backup is equal to the first LSN of a full backup, then the two backups are likely physically related. The backup validator 124 can also check LSNs to verify that incremental backup files are physically related with each other and with a full backup file.

In another embodiment, the backup validator 124 can use native data store tools to verify that the backups are related. For instance, some data stores include a metadata file that includes information that links backup files. The backup validator 124 can access or query this metadata file to determine relatedness between files in addition to or instead of examining LSNs in the backup file headers. If the full backup is not physically related, the backup validator 124 can escalate to a full backup and/or notify a system administrator of the problem at block 608.

It is further determined at block decision 606 whether any of the backup files are corrupted. If so, the backup validator 124 can escalate to a full backup and/or notify a system administrator of the problem at block 608. Otherwise, the process 600 proceeds to block 610. At block 610, the backup files are locked to keep them from being accessed via external methods (e.g., other than by a restore process), further reducing possible loss or corruption of data. Locking of files is optional in certain implementations.

VI. Intelligent Cleanup

Figure 7A:
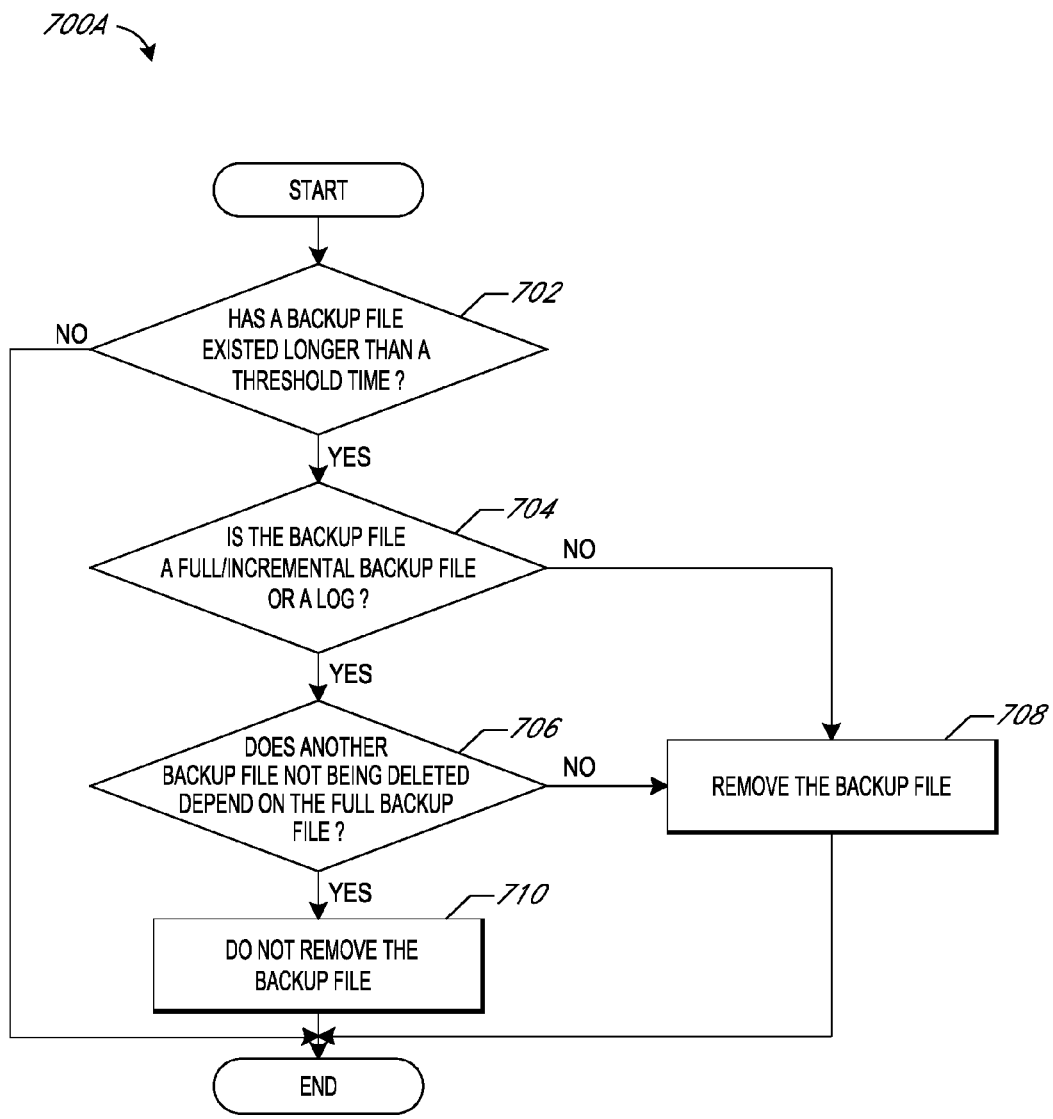
FIG. 7A depicts a flowchart illustrating an embodiment of a process for intelligently removing backups.

Another optional feature of the intelligent backup system 110 is intelligent cleanup, which can be performed by the cleanup module 126. FIG. 7A illustrates an embodiment of a process 700A for intelligently deleting backups. The process 700A advantageously provides a mechanism that in certain embodiments allows removal of old backups without disrupting backup set integrity.

At decision block 702, it is determined whether a backup file has existed longer than a threshold time. This threshold can be user-defined and can specify a point in time after which old backup files are to be removed (e.g., deleted or archived). In an embodiment, removing old backup files can include removing a portion of a backup set file if a backup set is contained in a single file. In such embodiments, when creating the backup set file, the backup module 132 of FIG. 1 can create an index or mapping of the backup set file. This index can include start and end points of separate full and partial backup portions of the file. The cleanup module 126 can access the index to determine the start and end points so as to selectively remove portions of the backup set file.

If the threshold is not met, the process 700A ends. The process 700A can be repeated for each backup file. If the threshold is met, it is further determined at decision block 704 whether the backup file is a full backup file, an incremental backup file, a log, or the like. If not, the file is a differential file. It can therefore be safe to remove the file because differential files are not physically linked to one another in certain implementations. The file is then removed at block 708.

Otherwise, at decision block 706, it is determined whether a later backup file not being deleted depends on the full or incremental backup file or log. The dependency can be determined by analyzing whether the files are physically related, using any of the techniques described above with respect to FIG. 6. If the files are physically related, the full backup file is not removed at block 710. If it were to be removed, the later backup file can no longer be restored without its corresponding full backup file. However, if there is no dependency on another backup file, it can safely be removed at block 708.

Figure 7B:
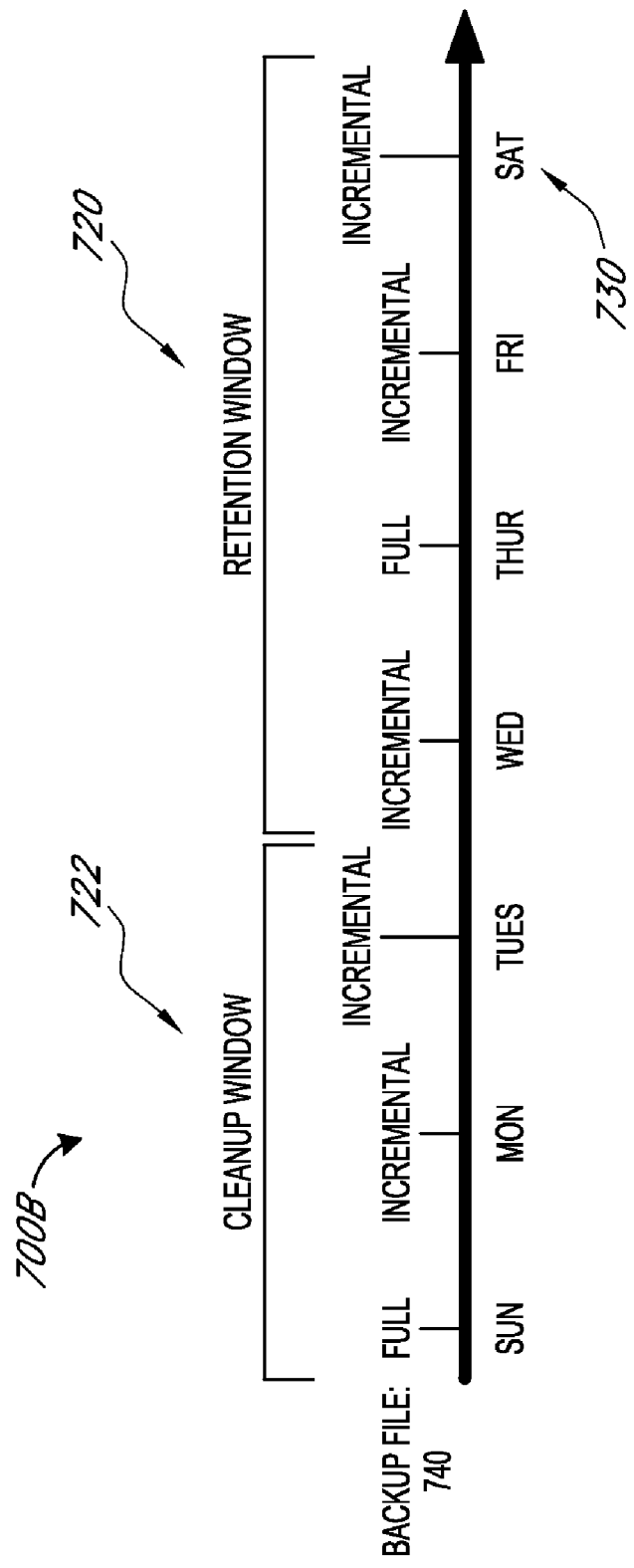

FIG. 7B depicts an example timeline 700B that illustrates the intelligent cleanup features described above with respect to FIG. 7A. In some systems, a data retention policy may be in effect. The data retention policy might state, for example, that restores should be possible to any point in time within a certain number of days. In the illustrated example, a retention window 720 of four days is shown. Thus, the retention window 720 extends back from the current day 730, Saturday, through the previous Wednesday. Backup files 740 should therefore be retained to enable restores on any of the days in this window 720.

A cleanup window 722 is also shown. The cleanup window 722 includes days for which backup files 740 may be removed (e.g., deleted or archived). However, in this example, incremental backups were performed on Monday and Tuesday of the cleanup window 722. An incremental backup was also performed on Wednesday, the last day of the retention window 720. If either of the incremental backups in the cleanup window 722 were removed, the incremental backup on Wednesday of the retention window 720 cannot be restored. Thus, in certain embodiments, the cleanup module 126 would retain the incremental backup files on Monday and Tuesday even though they are in the cleanup window 722. Similarly, a full backup file on Sunday of the cleanup window 722 should be retained to enable restoring of the incremental backup file on Wednesday.

FIG. 7C depicts another example timeline 700C that further illustrates the intelligent cleanup features described above with respect to FIG. 7A. Like the timeline 700B of FIG. 7B, the timeline 700C includes the retention window 720 and the cleanup window 722. However, in this timeline 700C, a full backup was performed on Sunday and differential backups were performed thereafter.

Because none of the differential backups depend on each other and only depend on the full backup, any of the differential backups in the cleanup window 722 can be removed safely. Thus, even if the differential backups on Monday and Tuesday were removed, any of the differential backups in the retention window 720 can still be recovered so long as the full backup on Sunday is not removed.

VII. Example User Interfaces

Figure 8:
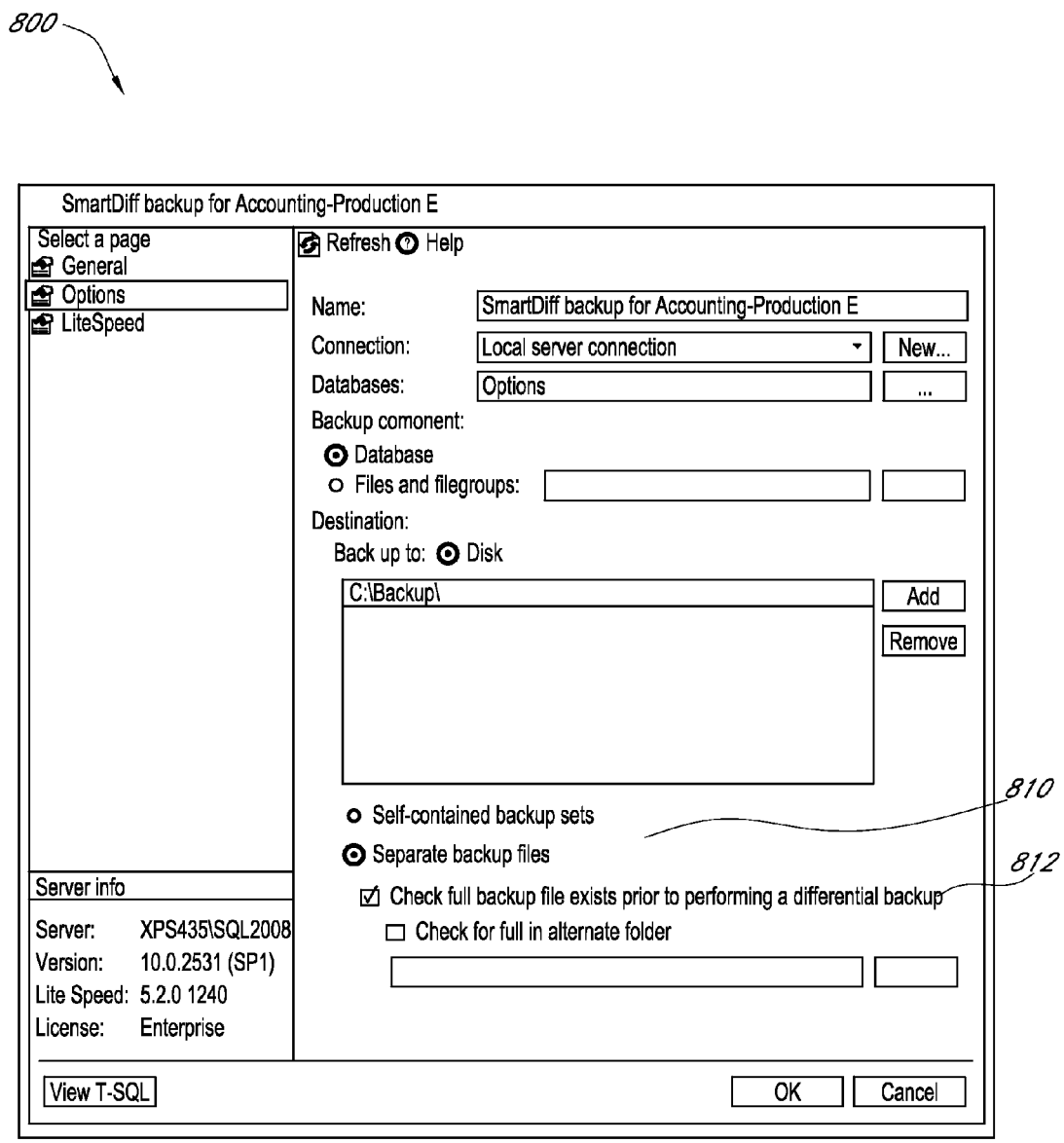
FIGS. 8 and 9 depict embodiments of user interfaces that provide functionality for a user to control backup escalation.
Figure 9:
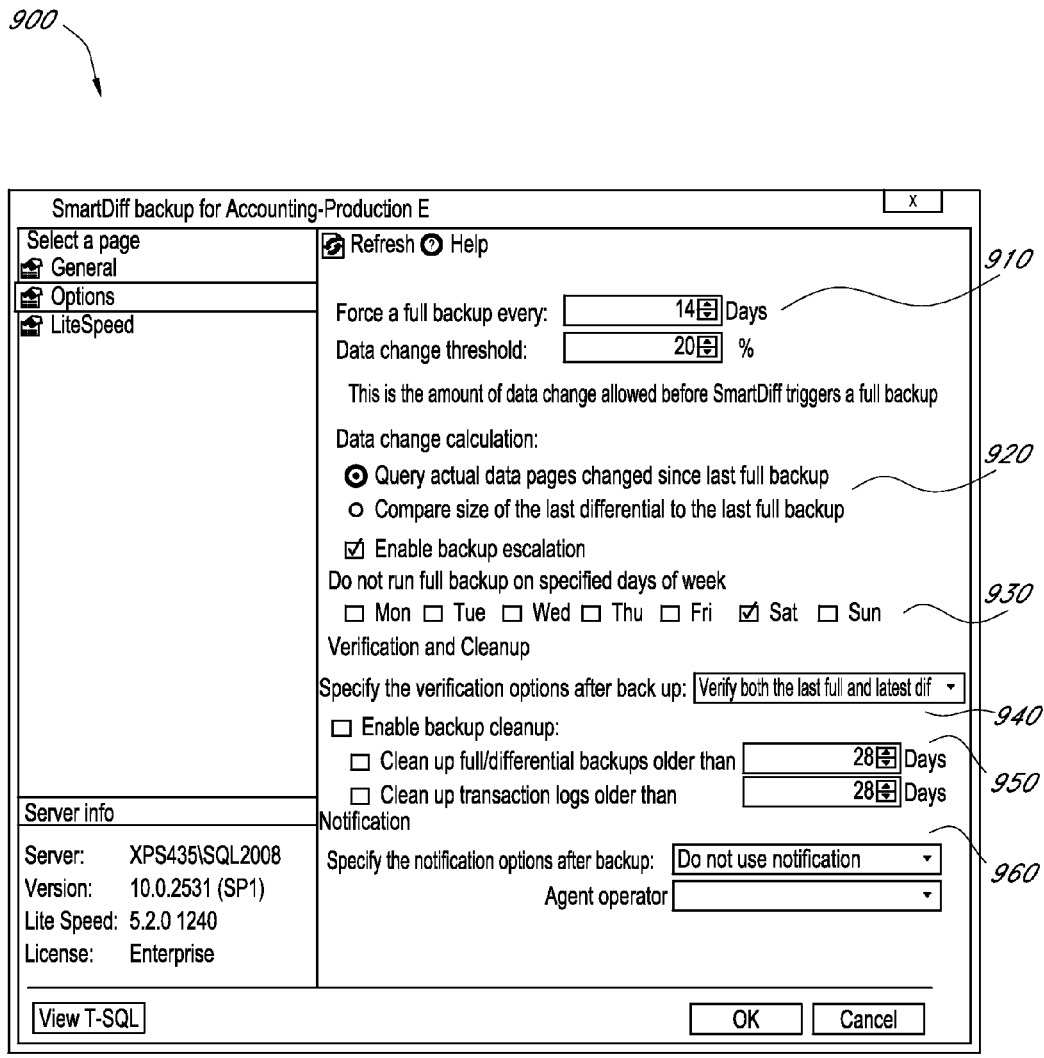

FIGS. 8 and 9 depict embodiments of user interfaces 800, 900 that can provide functionality for a user to control backup escalation. Each of the user interfaces 800, 900 can be generated by the control console 134. Alternatively, the user interfaces 800, 900 can be generated on the client device 136.

Referring to FIG. 8, a first backup management interface 800 is shown. The backup management interface 800 includes options 810 for managing data store backups. In the embodiment shown, these options 810 include the option to store full and partial backup files in a single self-contained file or in separate backup files. In addition, a validation option 812 is shown for checking whether a full backup file exists prior to performing a partial (e.g., differential) backup. This option 812 can determine whether the decision block 310 of the process 300 is performed (see FIG. 3).

Various escalation parameters are shown in a second backup management interface 900 in FIG. 9. In the interface 900, escalation parameters 910 include a maximum backup interval and a data change threshold. The example maximum backup interval shown is 14 days and the example data change threshold shown is 20%. Further escalation parameters 920 are also provided for selecting the manner in which changes are calculated. These parameters 920 include the option to query actual data pages in the data store that have been changed since the last full backup and the option to compare the size of the last differential to the last full backup. These escalation parameters 920 allow selection of the access or comparison methods for determining data changes described above with respect to FIG. 2.

Further escalation parameters 930 are shown for selecting blackout days. A checkbox next to a given day, for instance, results in a full backup being prevented from running on a selected day. Validation parameters 940 specify ways to validate backups after they are performed. These parameters 940 can include any of the validation options described above. In one embodiment, these parameters 940 can also include the option to validate or verify the last backup, to validate both the last full and latest partial backup, and to validate the last full and all associated partial backups.

Cleanup options 950 provide functionality for user to enable backup cleanup along with time thresholds for cleaning up full and partial backup files and logs. Notification options 960 allow users to specify what type of notification to receive for different backup events. Some possible notification options 960 include not using notification, notifying every time a backup occurs regardless of success or failure, or notifying only in the case of failure.

Although not shown in the user interfaces 800, 900, in some embodiments, qualitative options can be provided instead of quantitative options for escalation parameters. For example, a user interface could provide options to optimize backups for backup time, restore time, and/or storage utilization. Upon a user selecting one of these options, the escalation module 122 can automatically select escalation parameters (e.g., using the processes described above with respect to FIGS. 5A and 5B).

In one embodiment, the user interface might also provide options for the user to perform backups in a manner that improves or optimizes data store availability. In such embodiments, the escalation module 122 might select to perform a full or partial backup depending on an analysis of impact to computing resources that full or partial backups can have. The escalation module 122 can analyze computing resource usage using the techniques described above with respect to FIG. 2. In addition to determining whether to run a full or partial backup, the escalation module 122 can also increase data store availability by throttling a backup process. For instance, the escalation module 122 can reduce computing resource usage of a backup process by allocating fewer processors or processor cores to a backup process.

Moreover, the user interface can also provide functionality for users to simulate different thresholds to project potential backup time and/or storage space savings. For example, the escalation module 122 can analyze a backup history with respect to user's escalation parameters. The analysis can determine, for example, when different escalation parameters triggered a full backup. This analysis can help the user determine whether the chosen parameters were never effective, whether they were effective but now should be updated, or whether they are still effective. Since the escalation module 122 can know the size and type of the backups and the thresholds provided by the user, the escalation module 122 can not only analyze historical backups but also project what escalation parameters may be useful in the future. This analysis can be used by the escalation module 122 to auto-tune the escalation parameters, e.g., as using the techniques described above with respect to FIGS. 5A and 5B.

VIII. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of managing a backup of a data store, the method comprising:
    by a computer system comprising computer hardware:
        receiving user-supplied parameters for determining whether to initiate a full backup of a data store instead of a partial backup of the data store, the user-supplied parameters comprising a data change threshold and a time threshold;
        performing a first full backup of the data store;
        performing a first partial backup of the data store subsequent to performing the first full backup of the data store;
        monitoring the data store according to the user-supplied parameters, said monitoring comprising:
            determining whether an amount of data change in the data store satisfies the data change threshold, wherein said determining comprises counting modifications of data in the data store toward the data change threshold while not counting additions of data to the data store toward the data change threshold, the modifications of data comprising changes to existing data in the data store and the additions of data comprising new data added to the data store, and
            determining whether a period of time since the first full backup occurred satisfies the time threshold;
        performing a second full backup instead of a second partial backup in response to the data change threshold being satisfied; and
        if neither the data change threshold nor the time threshold are satisfied, performing the second partial backup of the data store.

2. The method of claim 1, further comprising automatically adjusting one or both of the data change threshold and the time threshold based at least in part on an analysis of a backup history corresponding to the data store.

3. The method of claim 1, further comprising validating a backup set comprising the first full backup and the first partial backup, said validating comprising performing one or more of the following:
    determining whether a file corresponding to the first full backup can be located;
    determining whether the file corresponding to the first full backup and a file corresponding to the first partial backup properly reference each other; and
    determining whether the files corresponding to the first full backup and the first partial backup are corrupted.

4. The method of claim 1, further comprising automatically deleting one or more backup files only if the one or more backup files do not depend on another backup file that is not being deleted.

5. The method of claim 1, wherein the partial backup is selected from the group consisting of a differential backup and an incremental backup.

6. An intelligent backup system for managing a backup of a data store, the system comprising:
    a computer system comprising computer hardware, the computer system programmed to implement:
        a backup module configured to perform a full backup of a data store and a partial backup of the data store, the full and partial backups at least partially constituting a backup set for the data store;
        a control console configured to provide a user interface comprising functionality for a user to supply one or more escalation parameters, the one or more escalation parameters comprising a data change threshold; and a backup agent in communication with the data store, the backup agent comprising an escalation module configured to:

monitor the data store according to the one or more escalation parameters by at least determining whether an amount of data change in the data store satisfies the data change threshold, wherein said determining comprises counting modifications of data in the data store toward the data change threshold while not counting additions of data to the data store toward the data change threshold, the modifications of data comprising changes to existing data in the data store and the additions of data comprising new data added to the data store, and automatically trigger the backup module to start a second backup set in response to determining that the one or more escalation parameters have been satisfied.

7. The system of claim 6, wherein the user interface provides further functionality for the user to specify one or more blackout days in which a second full backup cannot be performed.

8. The system of claim 6, wherein the escalation module is further configured to trigger the backup module to start the second backup set in response to determining that a number of files threshold has been satisfied.

9. The system of claim 6, wherein the one or more escalation parameters further comprise one or more of a time threshold, and a number of files threshold.

10. A non-transitory computer-readable storage medium comprising computer-executable program instructions configured to implement, in one or more processors, a method of managing a data store, the method comprising:

performing a first full backup of a data store;
performing a first partial backup of the data store;
programmatically monitoring an amount of change with respect to the first partial backup;

determining whether the amount of change satisfies a threshold, wherein said determining comprises counting modifications of data in the data store toward the threshold while not counting additions of data to the data store toward the threshold, the modifications of data comprising changes to existing data in the data store and the additions of data comprising new data added to the data store;

automatically performing a second full backup in response to determining that the amount of change satisfies the threshold; and performing a second partial backup in response to determining that the amount of change does not satisfy the threshold.

11. The non-transitory computer-readable storage medium of claim 10, wherein said determining whether the amount of change satisfies the threshold comprises determining whether an amount of time to perform the first partial backup satisfies the threshold.

12. The non-transitory computer-readable storage medium of claim 10, wherein said determining whether the amount of change satisfies the threshold comprises determining whether computing resource consumption associated with the first partial backup satisfies the threshold.

13. The non-transitory computer-readable storage medium of claim 10, wherein the method further comprises programmatically determining a value of the threshold based at least in part on one or more characteristics of the data store.

14. The non-transitory computer-readable storage medium of claim 10, wherein the method further comprises automatically adjusting the threshold based at least in part on an analysis of a backup history of the data store.

15. The non-transitory computer-readable storage medium of claim 10, wherein said programmatically monitoring the amount of change comprises determining a difference in size between the first full backup and the first partial backup.

16. The non-transitory computer-readable storage medium of claim 15, wherein said determining the difference in size is performed in response to failing to determine a quantity of storage units changed since a previous full backup.

\* \* \* \* \*